United States Patent [19]

Bertsch et al.

[11] Patent Number: 4,664,142

[45] Date of Patent: May 12, 1987

[54] PRESSURE REGULATING DEVICE

[75] Inventors: Richard Bertsch, Asperg; Dieter Günther, Murr; Claus Ruppmann, Stuttgart, all of Fed. Rep. of Germany

[73] Assignee: Robert Bosch GmbH, Stuttgart, Fed. Rep. of Germany

[21] Appl. No.: 800,499

[22] Filed: Nov. 21, 1985

[30] Foreign Application Priority Data

Feb. 19, 1985 [DE] Fed. Rep. of Germany ....... 3505625

[51] Int. Cl.[4] .............................................. F16K 31/12

[52] U.S. Cl. .................................... 137/507; 137/510; 137/568; 251/145; 123/510

[58] Field of Search ........................ 137/510, 507, 568; 251/145; 123/510, 511, 512; 138/171

[56] References Cited

U.S. PATENT DOCUMENTS

| | | | |
|---|---|---|---|
| 45,083 | 11/1864 | Savoral | 138/171 X |
| 3,572,381 | 3/1971 | Nash | 137/568 |
| 3,746,039 | 7/1973 | Demi | 251/145 X |
| 4,231,347 | 11/1980 | Ohumi | 137/510 X |
| 4,300,510 | 11/1981 | Ishida | 137/510 X |
| 4,376,523 | 3/1983 | Goyen | 251/145 X |
| 4,505,296 | 3/1985 | Field | 137/510 |
| 4,570,600 | 2/1986 | Atkins | 251/145 X |

FOREIGN PATENT DOCUMENTS

| | | | |
|---|---|---|---|
| 2816479 | 10/1979 | Fed. Rep. of Germany . | |
| 702424 | 1/1954 | United Kingdom | 137/507 |

*Primary Examiner*—Harold W. Weakley
*Attorney, Agent, or Firm*—Edwin E. Greigg

[57] ABSTRACT

A pressure regulating device is proposed, which serves to regulate the fuel pressure in a fuel injection system for internal combustion engines. The pressure regulating device includes a pressure regulating valve which has a valve diaphragm fastened in a valve housing and defining a fuel chamber which communicates via an inflow opening with a fuel distributor line. Protruding into the fuel chamber is a valve seat body joined to the valve housing, on one end of which body a valve seat is formed and the other end of which is embodied as an outlet pipe that passes through the wall of the fuel distributor line. The fuel distributor line is formed of two shell halves inserted one inside the other, of which the first shell half has a tub-shaped end into which the pressure regulating valve is inserted and with which it is securely fastened.

4 Claims, 2 Drawing Figures

PRESSURE REGULATING DEVICE

BACKGROUND OF THE INVENTION

The invention is based on a pressure regulating device as generically defined hereinafter. A pressure regulating device has already been proposed in which the pressure regulating valve is mounted on a fuel distributor line and soldered to it. The total cross section required for this in the fuel distributor line not only increases the amount of space that is required but also requires the outlet pipe to be relatively long, so as to pass through the fuel distributor line.

OBJECT AND SUMMARY OF THE INVENTION

The pressure regulating device according to the invention has the advantage over the prior art that the fuel distributor line and the pressure regulating valve are simple in embodiment and that it is relatively easy to mount the pressure regulating valve on the fuel distributor line, while requiring little space.

In a particularly advantageous feature of the invention, the fuel distributor line is formed of two halves of a shell, and the pressure regulating valve is inserted into the first half; as a result, the outlet pipe can be kept short in length.

It is also advantageous for the second shell half of the fuel distributor line to be elastic, so as to damp pressure pulsations.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
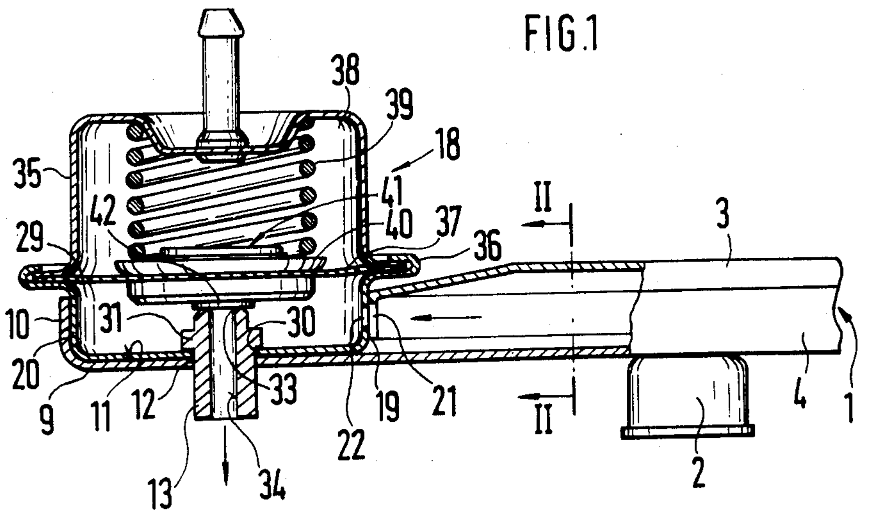
FIG. 1 is a simplified cross sectional illustration of a pressure regulating device according to the invention.

In FIG. 1, a rigid metal fuel distributor line of a fuel injection system for internal combustion engines is shown at 1 and has a plurality of plug connections 2, into which the fuel injection valves are inserted with one end.

Figure 2:
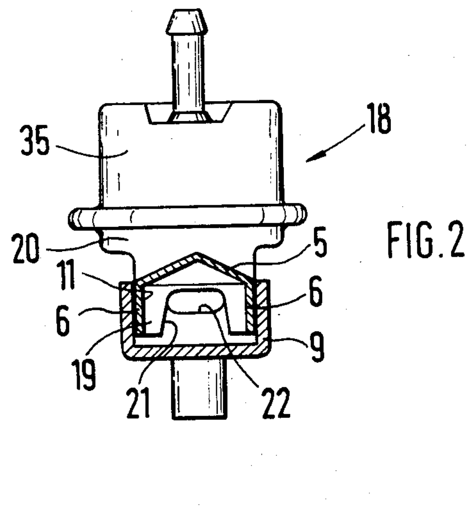
FIG. 2 is a partial sectional view taken along the line II—II of FIG. 1.

The fuel distributor line 1 advantageously comprises two halves of a shell 3 and 4, extending in the longitudinal direction, of which the shell half 3, for instance, as shown in FIG. 2, has a triangular wall part 5 and two side walls 6 extending parallel to one another, which are inserted into the rectangular or trough-shaped first half 4 and joined to it by welding or soldering, so that the shell halves 3, 4 form a cross section for the fuel pumped by a fuel feed pump, not shown. The plug connections 2 for the fuel injection valves are secured on the first shell half 4, which is substantially embodied rigidly enough that it assures the necessary rigidity of the fuel distributor line. In contrast to this, the second shell half 3 is provided with elastic wall parts 5, 6, which are thin-walled enough that by their deformation they damp pressure pulsations in the fuel, which are caused by the fuel pumping or by the intermittent operation of the fuel injection valves.

The first shell half 4 has a tub-shaped end 9, which is longer in the longitudinal direction than the second shell half 3 and has an end wall 10, extending crosswise to the longitudinal direction of the fuel distributor line and forming a receiving opening 11. In the tub-shaped end 9 of the first shell half 4, a through opening 12 is provided, through which an outlet pipe 13 of a pressure regulating valve 18 protrudes to the outside. The pressure regulating valve 18 is inserted into the receiving opening 11 of the tub-shaped end 9 of the first shell half 4. The second shell half has, on its end oriented toward the pressure regulating valve 18, a bent fastening strap 19, which grasps the pressure regulating valve 18 facing the end wall 10. The securing strap 19, the end wall 10 and the side walls of the tub-shaped end 9 of the first shell half 4 which grasp a bottom part 20 of the pressure regulating valve 18 are soldered tightly to the bottom part 20. The securing strap 19 has an opening 21, which is aligned with respect to and straddles an inflow opening 22 in the bottom part 20 of the pressure regulating valve 18, so that fuel can flow out of the fuel distributor line 1 into a fuel chamber 29 of the pressure regulating valve 18.

A valve seat body 31 which is joined to the outlet pipe 13 and is soldered or welded to the bottom part 20 is inserted into a means defining an opening 30 of the bottom part 20. The valve seat body 31 protrudes into the fuel chamber 29, in which it ends, forming a valve seat 33. An outlet conduit 34 begins at the valve seat 33 and leads through the valve seat body 31 to the outlet pipe 13 and from there to a fuel return line.

Between the bottom part 20 and a cap 35 of the pressure regulating valve 18, a resilient valve diaphragm 37 is fastened by means of a crimped portion 36. In the pressure regulating valve 18, this diaphragm 37 divides the fuel chamber 29 from a spring chamber 38. A compression spring 39 is disposed in the spring chamber 38 and is supported at one end on the cap 35 and at the other on a spring plate 40, which is secured to the valve diaphragm by means of a rivet connection 41 that passes through the valve diaphragm 37 in a sealed manner. The rivet connection 41 has a valve plate 42 which protrudes into the fuel chamber 29 and cooperates with the valve seat 33; the valve plate 42 is urged in the direction toward the valve seat 33 by the compression spring 39. If the fuel pressure in the fuel distributor line, and hence in the fuel chamber 29 as well, rises above a value that is predetermined by the force of the compression spring 39, then the valve plate 42 is raised from the valve seat 33, and fuel can flow out via the outlet conduit 34. The pressure regulating device according to the invention makes a space-saving structure possible and also enables quick mounting of the fuel distributor line 1 and pressure regulating valve 18.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure regulating device comprising a rigid fuel distributor line adapted to supply fuel to fuel injection valves of a fuel injection system for internal combustion engines, a housing disposed on and joined to said rigid fuel distributor line, said housing including an upper portion and a bottom portion that includes a bottom enclosure wall, a pressure regulating valve, said pressure regulating valve having a resilient wall disposed in said housing between said upper and bottom portion of said housing, said resilient wall adapted to define a fuel chamber in said bottom portion of said chamber, an outlet conduit, a valve plate secured to said resilient wall which cooperates with a valve seat on said outlet conduit in said fuel chamber, said fuel distributor line further including a tub-shaped end portion, said tub-shaped end portion having a closed end, bottom and side portions arranged to receive said bottom portion of said housing which is secured within the confines of said tub-shaped end portion bottom enclosed wall to bottom portion of said fuel distributor line, one inlet opening in said fuel distributor line and said bottom wall portion of said housing which is in communication with said fuel chamber, and said outlet conduit forming said valve seat on one end thereof including an opposite end of said conduit which extends from said bottom enclosure wall of said housing through an opening in said tub-shaped end portion to a fuel return line.

2. A pressure regulating device as defined by claim 1, in which said fuel distributor line further comprises first and second shell halves which extend in a longitudinal direction thereof, said second shell half being partially inserted into said first shell half and securely fastened thereto, and further that said outlet conduit of said pressure regulating valve passes through means defining said opening in said first shell half which forms said bottom portion of said tub-shaped end portion.

3. A pressure regulating device as defined by claim 2, in which said shell halves are soldered together.

4. A pressure regulating device comprising a rigid fuel distributor line including a second shell half partially inserted into a first shell half adapted to supply fuel to fuel injection valves of a fuel injection system for internal combustion engines, a housing disposed on and joined to said rigid fuel distributor line, said housing including a pressure regulating valve, said pressure regulating valve having a resillient wall disposed in said housing, said resilient wall adapted to define a fuel chamber in a bottom portion of said chamber, an outlet conduit, a valve plate secured to said resilient wall which cooperates with a valve seat on said outlet conduit in said fuel chamber, said first shell half of said fuel distributor line further including a tub-shaped end portion arranged to receive a portion of said bottom portion of said housing which is secured to said tub-shaped end portion of said fuel distributor line, at least one inlet opening in said fuel distributor line and said bottom portion of said housing which is in communication with said fuel chamber, and said outlet conduit forming said valve seat on one end thereof includes an opposite end of said conduit which extends from a bottom wall of said housing through means defining an opening in a wall of said first shell half of said fuel distributor line to a fuel return line, and said second shell half is formed with an elastic wall which is adapted to damp pulsations of the fuel in said fuel distributor line.

* * * * *